United States Patent [19]

McWhorter

[11] 4,238,940
[45] Dec. 16, 1980

[54] VARIATION IN SELF SECURING THEFT PROOF CHAIN BINDER

[76] Inventor: Delmer L. McWhorter, 929 Drever St., West Sacramento, Calif. 95691

[21] Appl. No.: 34,870

[22] Filed: Apr. 30, 1979

[51] Int. Cl.³ .............................................. E05B 73/00
[52] U.S. Cl. ........................................ 70/14; 70/61; 70/202
[58] Field of Search .................... 70/61, 57, 58, 14, 19, 70/201, 202, 203, 205; 254/78, 74; 24/68 CT

[56] References Cited
U.S. PATENT DOCUMENTS

| | | | |
|---|---|---|---|
| 3,789,464 | 2/1974 | Collenus | 24/68 CT |
| 3,954,252 | 5/1976 | Lyons | 254/78 |
| 3,974,668 | 8/1976 | McWhorter | 70/14 |
| 4,062,206 | 12/1977 | McWhorter | 70/14 |

Primary Examiner—Robert L. Wolfe
Attorney, Agent, or Firm—Blair, Brown & Kreten

[57] ABSTRACT

A self securing theft proof chain binder, such as would be used to cinch a chain tightly holding a cargo to a truck flatbed. The binder has hooks on either of its ends to attach to the ends of the chain overlapping the cargo and the binder is pivoted in the middle so that when it has been squeezed together it tightly draws together the two ends of the chain. The lever arm on the binder has a projecting spur with a notched tooth thereon which in turn mates with a lock on the other half of the binder so that when the two halves are squeezed together they lock in place.

9 Claims, 8 Drawing Figures

U.S. Patent     Dec. 16, 1980     4,238,940
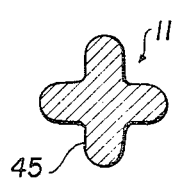
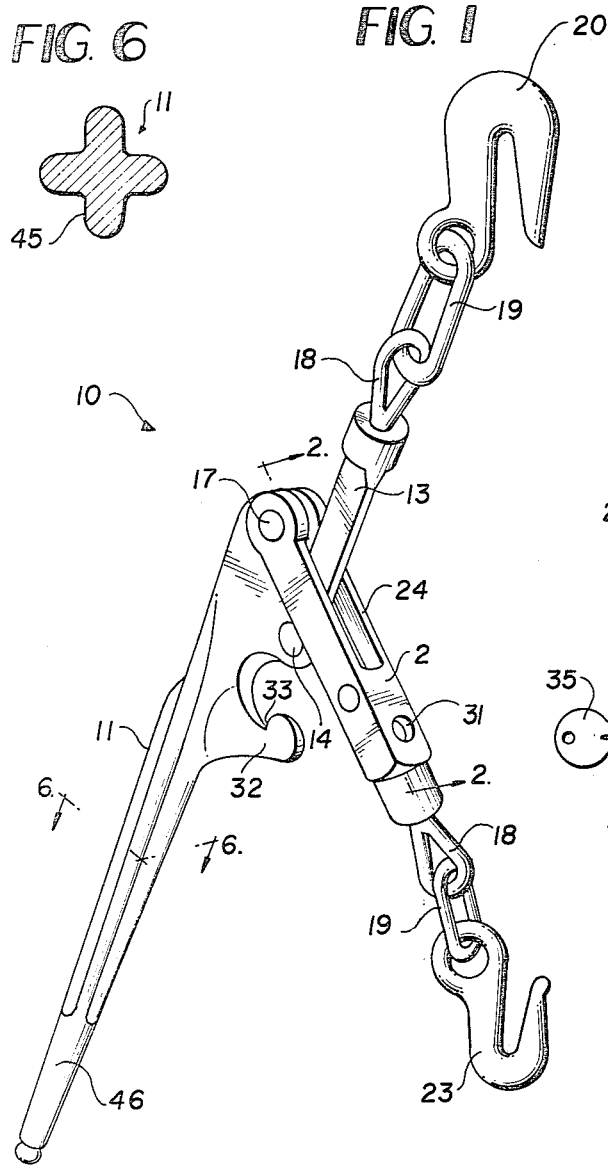
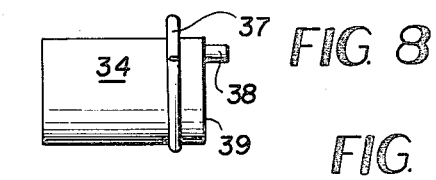
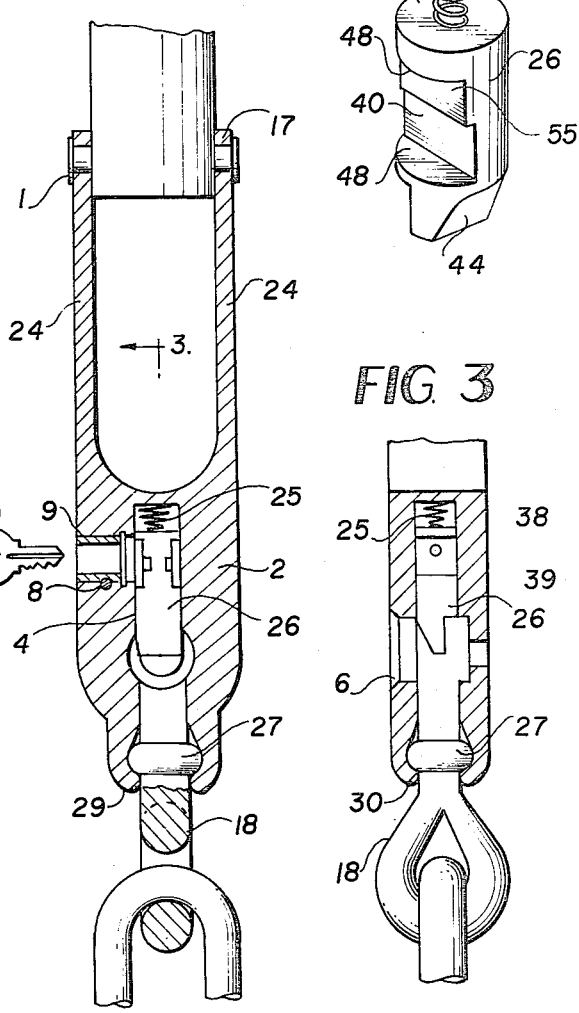
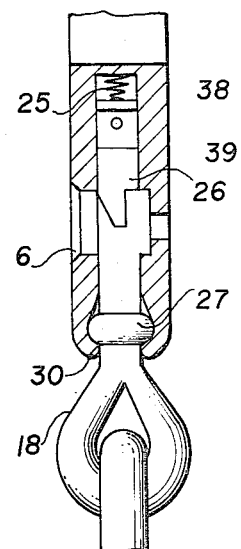
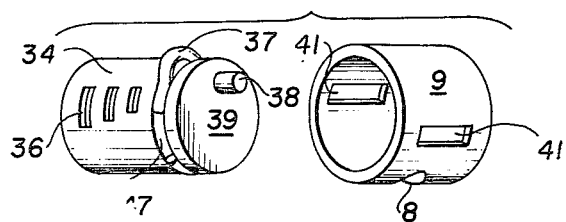
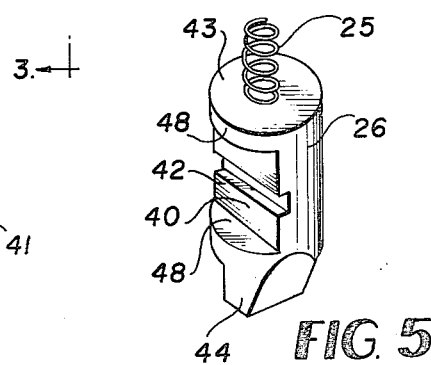

VARIATION IN SELF SECURING THEFT PROOF CHAIN BINDER

BACKGROUND OF THE INVENTION

The present invention relates to self securing theft proof chain binders. This binder includes two half portions hinged in the middle which are attached at their extremities remote from the hinged portion to chains which are used to secure tightly the load of merchandise as by girdling typically to some sort of truck bed. The ends of the chain are attached off center of the two halves so that when the halves are squeezed together there is a tightning action on the ends of the chain. The lever arm or the binder in this case has a projecting spur which is rounded at its end and has a notch on one side which mates with a lock bolt on the other half of the binder in such a manner that when the two halves are squeezed together, the spur enters into a spring urged latch forming part of the lock. This automatically secures the two halves of the binder and therefore the chain cannot arbitrarily be removed. Further, an eyelet provided on a cable sling can extend over the spur which is then locked. The ensuing detailed description provides variations and improvements over binders currently held by the applicant U.S. Pat. No. 3,974,688 and U.S. Pat. No. 4,062,206. The earlier patent specifies that the lock be fastened to the first swivel which in turn is fastened to a fitting. The later patent specifies that the keeper disc mounted in the keeper link has a conical bolt opening therethrough and further that the lock boss be conical.

SUMMARY & OBJECTS OF THE INVENTION

The present application has as an object to provide a binder which has a handle whose cross section is X or I-shaped so as to provide a greater strength.

Further objects contemplate providing a binder in which a lock cylinder can be used or a dummy cylinder employed, the former providing security as well as positive load retention while the latter provides sure load retention.

A further object is to provide a lock mechanism which is capable of replacement, but once installed and locked cannot be forced open, and is durable in construction.

Another object is to provide a lock of the dead bolt type, which is defined as a lock capable of being released by the insertion of a foreign object at the area where the latching occurs to overcome simple spring biasing forces.

Another object is to provide a binder having a latching which can be used without an excluding locking mechanism so as to securely girdle a load without locking when fear of theft is not a concern but when positive load retention is desired.

These and other objects will be made manifest when considering the following detailed specification and drawings.

BRIEF DESCRIPTION OF THE DRAWINGS

FIG. 1 shows an isometric view of the binder according to the present invention;

FIG. 2 is a sectional view taken along lines 2—2 of FIG. 1;

FIG. 3 is a sectional view taken along lines 3—3 of FIG. 2;

FIG. 4 is a detailed exploded parts view of the lock and cylinder sleeve according to the present invention;

FIG. 5 is a detailed view of the dead bolt latch according to the present invention;

FIG. 6 is a sectional view taken along lines 6—6 of FIG. 1;

FIG. 7 is a detailed view of the spring urged bolt according to the present invention; and FIG. 8 details a dummy cylinder devoid of tumblers.

DESCRIPTION OF THE PREFERRED EMBODIMENT

Referring to the drawings now, wherein like reference numerals refer to like parts throughout the various drawings, reference numeral 10 is directed to the binder apparatus according to the present invention.

This binder apparatus 10 can generally be defined as being provided with a handle 11 which terminates at one extremity with a truncated conical handle tip and upwardly therefrom a cross shaped handle in which the ribs 45 extend outwardly in an X-type pattern when seen in cross section (FIG. 6). These ribs 45 provide extra structural rigidity for the handle and in addition provide a gripping surface for ease in use. An I beam could also be used. The extremity of the handle remote from tip 46 is provided with two pivoted areas 14 and 17 and directly below this pivoted area is a spur 32 having a notched terminus 33 disposed on its top face proximate to the pivot points. The two pivot points 14, 17 are separated by a distance and the top most pivot point 17 connects to the lower portion of the binder known as the clevis section 2. The lower most pivot point is provided with a bar 13 which extends between a bifurcated clevis arm 24. These two clevis arms are pivoted at their extremity proximate to the handle as at 17, 14 and to this end, the clevis arms are provided with holes 1 for mounting on the handle. These clevis arms 24 extend downwardly and terminate into the main clevis section 2 in a U-shaped terminal portion. The bar 13 which extends between the two clevis arms terminates in a swivel housing provided with a swivel having an eye 18. The cross section of this swivel and its anchor to the bar 13 is somewhat similar to that which is shown in the bottom portion of FIG. 2, and therefore has not been drawn twice. The swivel with the eye 18 is constrained within the swivel housing 29, by virtue of a swedged swivel button 27 and the housing is provided with an annular lip portion 30 which surrounds the button to retain it within the housing. Thereafter, the eyelet hooks to a link 19 and thereafter to a hook 20. The clevis section is similarly provided with a similar type of swivel eyelet at the clevis section remote from the clevis arm and reference numeral 27 corresponds to the swedge swivel button, reference numeral 29 corresponds to the swivel housing, and reference numeral 30 corresponds to the lip. A second intermediate link 19 interconnects the eyelet with a hook 23. The locking structure of the clevis section will now be discussed in detail. The clevis section and the lock housing 2 is provided with three substantially cylindrical and relative to each other orthogonally disposed voids. The first void is located substantially coaxially with the longitudinal extent of the lower binder, and as shown in FIGS. 2 and 3 would provide a hole for the bolt 26. Near the top portion of this hole 4 is an orthogonally disposed lock hole which extends to an outer face of the clevis and serves as the nesting area for the lock cylinder and sleeve as to be explained hereinafter. Communicating also with the bolt hole 4 is a third hole orthogonal to both the first and second holes discussed above and extends through the entire clevis and is oriented to register with the spur and the notched terminus of the spurs 32 and 33. It is preferred that the hole or opening proximate to the spur be of substantially twice the diameter as the hole on the opposed side of the clevis and that purpose will be discussed hereinafter.

The specifics of the lock mechanism will now be discussed in detail. The bolt hole 4 is provided at the top end of the hole with a conical bolt spring 25 which tapers downwardly and is fastened to abut against and bis the lock bolt 26. It will be appreciated therefor that the natural tendency of lock bolt 26 would be to be in a position in which the spring is free of compression. The lock bolt is provided with a top face 43, and a bottom latch 44 (FIG. 5), a substantially cylindrical medial portion upon which one face is provided with a planar wall 40 which is relatively inset because of upper and lower step portion 48. This wall or bolt face 40 is provided with a trackway 42 medially disposed between the top and bottom step portions. When inserted into the hole 4, this bolt face 40 addresses the hole 4 in the cylinder lock.

As shown in FIG. 4, the locking mechanism is provided with a lock cylinder 34, and on its opposed faces a plurality of tumblers 36. In addition however, along a circumference of the cylinder near the inner face 39 and parallel thereto is a groove 47 which acts as a guide and nesting area for the loaded keeper spring 37. Axially offset from the longitudinal center of the circular inner face 39 is an outwardly extending cylinder pin 38. This pin when suitably assembled into the clevis section is meant to ride in the trackway 42 of the bolt latch 26. Surrounding the cylinder 34 and fitted into the hole for the cylinder, a cylinder sleeve 9 is provided. The dimension of the sleeve 9 is such that it snugly engages the cylinder 34 and along opposed longitudinal faces thereof openings 41 have been provided to allow relative rotation of the cylinder when the tumblers have been properly retracted. The cylinder 34 is constrained from removal from within the sleeve by the bias of keeper spring 37. Additionally, sleeve 9 is provided with a pin element 8 acting between cylinder 9 and the clevis housing 2 to retain the sleeve cylinder with the housing.

In use and operation therefore, the latch bolt 26 extends downwardly covering the third hole and when the spur 32 is forced within that hole, the lock bolt slides downwardly and is biased against the force provided by the spring 25 locking 33 against 44. An eyelet of a cable looped over 32 will therefore be locked and secured. The cylinder pin 38 riding in the trackway 42 can be rotated by means of a key which will cause the lock bolt to go up and down dependent upon the relative position of the pin 38. In this way, pressure afforded by the spring on the bottom latch can be relieved and the spur can be removed as desired. The third hole as has been explained is provided with a smaller opening at the face opposite from the spur, in the preferred embodiment the dimension of this hole is one half the diameter of the front hole. The purpose of this opening existing at all is to serve as a drainage hole and the reason why this hole is narrower than the front hole is to not provide an area for access by a tool or the like to mechanically manipulate the lock bolt up so that to release the spur by an unauthorized person.

Further, it can be seen that this interconnecting passageway can provide a means for retracting the keeper spring 37 so as to remove the lock cylinder 34 and change the lock.

The interaction of the channel 42 with pin 38 effectively defines a dead bolt lock since the spring 25 is not the only force causing latch 44 to stay in key locked registry with the notch 33, however when unlocked, the apparatus operates as a conventional chain binder. Without groove 42 (FIG. 7) the spring is the sole retention force and this configuration can be used when a secure safety fastening is desired but it is not necessary to lock the structure for security. A stepped planar wall 55 exists thereon so that the lip between 55 and 40 provides a purchase for the pin 38 to unlock the mechanism. Also, a true cylinder lock may not be used. As an alternative a "dummy" cylinder, devoid of tumblers 36 (FIG. 8) can be used with a penknife or the like where the keyway is shown to assist in rotating the dummy cylinder.

In view of the foregoing, it is apparent that numerous structural modifications are contemplated as being a part of this invention as defined hereinabove and as specified hereinbelow by the claims.

What is claimed is:

1. A chain binder comprising a handle, an upper and lower pivot point on said handle, a bifurcated clevis arm disposed on said upper pivot point, a bar pivotally connected to the lower pivot point whereby said bar extends through the clevis arms, and a securing mechanism disposed within said clevis section comprising a first hole extending along the longitudinal axial extent of said clevis section, a second hole disposed proximate to the top portion of said first hole orthogonally thereto, a third hole orthogonally disposed to both said first and second holes downward from said second hole and extending through said clevis section, spring means disposed in said first hole at the top, a latch bolt disposed below said spring, means disposed in said second hole to move said latch bolt, and a spur disposed on said handle having a notch to register with said third hole whereby when said spur enters said third hole, said latch bolt rides upwardly in said first hole and latches against the notch disposed on said spur.

2. The device of claim 1 wherein said means to move said latch bolt comprises a cylindrical sleeve fastened within said second hole, a first channel disposed on said sleeve, a cylinder disposed with said sleeve having a plurality of tumblers along at least one cylindrical face at said channel thereof, a circumferential groove disposed on said cylinder, and a cylinder pin extending from said sleeve, disposed on an inner face of said cylinder, said groove is disposed along an inner portion of said sleeve, and a loaded keeper spring disposed in said groove to fixedly fasten to said cylinder within said sleeve, whereby when said means to move the latch bolt is unlocked the structure acts as a conventional binder.

3. The device of claim 2 in which tumblers are disposed on opposed sides of said cylinder and a second channel on said sleeve registers therewith.

4. The device of claim 3 wherein said cylinder pin engages said latch bolt to move the latch bolt up and down.

5. The device of claim 4 wherein said latch bolt comprises a generally cylindrical body having a circular planar top face and a toothed bottom latch, and includes a bolt face of planar configuration oriented to face said cylinder pin, said bolt face being provided with upper and lower step portions and a medially disposed horizontal trackway for engagement with said cylindrical pin.

6. The device of claim 5 in which a portion of said handle has an X-shaped configuration.

7. The device of claim 5 in which a terminal portion of said lock housing remote from a clevis bifurcated arm area is provided with a swivel end eyelet constrained within said clevis housing, said swivel including a swivel button disposed within said housing, and a lip portion disposed on said housing surrounding an aspect of said swivel button, thereby constraining said swivel within said housing.

8. The device of claim 1 in which said latch bolt comprises a generally cylindrical body having a circular planar top face and a toothed bottom latch, and includes a bolt face of substantially planar configuration oriented to face said second hole and a stepped portion on said planar face to provide a purchase area to move said latch bolt up and down.

9. The device of claim 7 in which said means to move said latch bolt comprises a dummy cylinder.

* * * * *